United States Patent
Gong et al.

(10) Patent No.: US 8,511,663 B2
(45) Date of Patent: Aug. 20, 2013

(54) SCREEN INSTALLATION DEVICE

(75) Inventors: Wei Gong, Shenzhen (CN); Nai-Lin Yang, New Taipei (TW); Hai-Bo Li, Shenzhen (CN); Min Zhuo, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 204 days.

(21) Appl. No.: 13/114,195

(22) Filed: May 24, 2011

(65) Prior Publication Data

US 2012/0186057 A1 Jul. 26, 2012

(30) Foreign Application Priority Data

Jan. 24, 2011 (CN) .......................... 2011 1 0025732

(51) Int. Cl.
*B25B 27/14* (2006.01)
(52) U.S. Cl.
USPC .......... 269/287; 269/302; 269/16; 269/289 R; 269/900
(58) Field of Classification Search
USPC .................. 348/58; 29/281.5; 361/679.58; 248/229.16, 917; 269/287, 289 R, 303, 309, 269/310, 900, 909
See application file for complete search history.

(56) References Cited

U.S. PATENT DOCUMENTS

| | | | | |
|---|---|---|---|---|
| 2,651,833 A * | 9/1953 | Kernahan | ......................... | 29/837 |
| 3,466,706 A * | 9/1969 | Asano | ............................. | 269/94 |
| 3,692,264 A * | 9/1972 | Burkhard et al. | ............. | 248/621 |
| 3,789,892 A * | 2/1974 | Converse et al. | ........ | 144/144.51 |
| 4,089,045 A * | 5/1978 | Mars | ............................ | 362/390 |
| 4,861,085 A * | 8/1989 | Lock et al. | ................... | 294/87.1 |
| 5,106,451 A * | 4/1992 | Kan et al. | ................... | 156/583.3 |
| 5,416,429 A * | 5/1995 | McQuade et al. | ........ | 324/754.07 |
| 5,419,626 A * | 5/1995 | Crockett | ......................... | 312/7.2 |
| 5,788,225 A * | 8/1998 | Iwata et al. | ................... | 269/309 |
| 5,963,421 A * | 10/1999 | Moss et al. | ............... | 361/679.21 |
| 6,262,582 B1 * | 7/2001 | Barringer et al. | ........ | 324/756.01 |
| 6,511,574 B2 * | 1/2003 | Barringer et al. | ............. | 156/295 |
| 6,741,298 B1 * | 5/2004 | Won | ............................... | 349/58 |
| 6,859,357 B2 * | 2/2005 | Morimoto et al. | ........ | 361/679.55 |
| 7,651,079 B2 * | 1/2010 | Lee et al. | ........................ | 269/21 |
| 2001/0035921 A1 * | 11/2001 | Yamanami | ..................... | 349/58 |
| 2003/0063230 A1 * | 4/2003 | Kato et al. | ....................... | 349/58 |
| 2004/0041748 A1 * | 3/2004 | Tanaka et al. | ................... | 345/30 |
| 2009/0165247 A1 * | 7/2009 | Lu et al. | ........................... | 16/337 |
| 2012/0181737 A1 * | 7/2012 | Yang et al. | .................... | 269/287 |

* cited by examiner

*Primary Examiner* — Lee D Wilson
*Assistant Examiner* — Tyrone V Hall, Jr.
(74) *Attorney, Agent, or Firm* — Altis Law Group, Inc.

(57) ABSTRACT

A screen installation device is used for assembling a screen plate to a frame, the screen installation device, and includes a positioning device and a plurality of connection devices. The positioning device is for locating the frame. The connection devices are detachably assembled to the positioning device and are arranged around the screen plate, and part of each connection device is located and retained between the screen plate and the frame to create a constant width gap between the screen plate and the frame.

20 Claims, 3 Drawing Sheets

SCREEN INSTALLATION DEVICE

BACKGROUND

1. Technical Field

The disclosure generally relates to mechanical devices, and more particularly to a screen installation device for electronic devices.

2. Description of the Related Art

Many electronic devices, such as mobile phones, and personal digital assistants, generally include a housing and a screen plate, the screen plate is usually manually assembled to the housing. However, the manual installation, which has poor accuracy, may result in an uneven gap between the housing and the screen plate, which cannot meet production needs.

Therefore, there is room for improvement within the art.

BRIEF DESCRIPTION OF THE DRAWINGS

Many aspects of an exemplary screen installation device can be better understood with reference to the following drawings. The components in the drawings are not necessarily drawn to scale, the emphasis instead being placed upon clearly illustrating the principles of the exemplary screen installation device. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
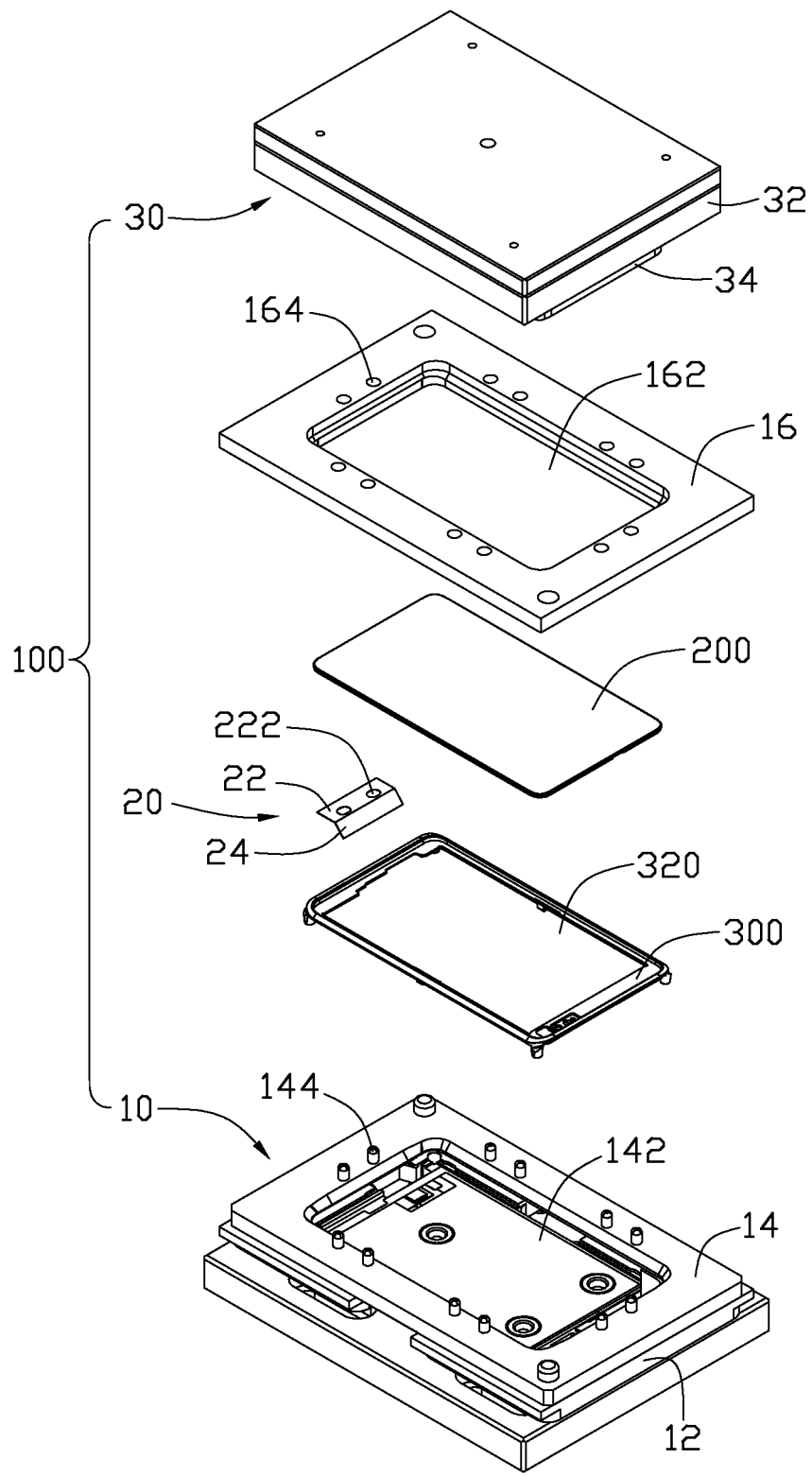
FIG. 1 is a schematic and exploded view of a screen installation device used to assemble a screen plate to a frame, according to an exemplary embodiment of the disclosure.

FIG. 1 shows an exploded view of a screen installation device 100 used to assemble a screen plate 200 to a frame 300 (e.g., a body of a portable electronic device), according to an exemplary embodiment of the disclosure. The frame 300 defines an opening 320 substantially located near the middle of the frame 300 and having perimeter walls 321. The screen plate 200 is detachably assembled and received within the opening 320.

The screen installation device 100 includes a positioning device 10, a plurality of connection devices 20, and a pressing device 30. In this exemplary embodiment, the number of the connection devices 20 is six, and one connection device 20 is taken here as an example. The positioning device 10 includes a positioning plate 12, a first fixed plate 14, and a second fixed plate 16. The positioning plate 12 is a substantially rectangular plate.

The first fixed plate 14 is located between the positioning plate 12 and the second fixed plate 16. The first fixed plate 14 is a substantially rectangular plate, and defines a first mounting hole 142. The first mounting hole 142 is substantially located near the middle of the first fixed plate 14 and passes through the first fixed plate 14. The first fixed plate 14 includes a plurality of mounting posts 144 located around the first mounting hole 142 and arranged on the surface of the first fixed plate 14 facing towards the second fixed plate 16.

Each connection device 20 can be made from rubber and includes a mounting portion 22 and a gap creating portion 24 extending from the mounting portion 22. The mounting portion 22 and the mounting posts 144 create a connecting assembly (not labeled). The structure of the connecting assembly assures the connection device 20 retains its proper positioning.

In the exemplary embodiment, the mounting portion 22 defines two through holes 222 for receiving the mounting holes 144. Each mounting post 144 is aligned with and is detachably received within the through hole 222 to assemble the connection device 20 to the first fixed plate 14. In this exemplary embodiment, where the mounting posts 144 are round or rectangular, the use of two mounting posts 144 per connection device 20 assures the connection device 20 retains its proper positioning. In cases where the mounting posts 144 have an irregular perimeter or key slot, etc., a single mounting post 144 and correspondingly shaped single through hole 222 may be used to achieve an interlock to assure proper positioning of the connection device 20.

The second fixed plate 16 is a substantially rectangular plate, and defines a second mounting hole 162, which is located substantially near the middle of the second fixed plate 16 and passes through the second fixed plate 16. The second mounting hole 162 is substantially aligned with the first mounting hole 142. The second fixed plate 16 further defines a plurality of positioning holes 164 through the second fixed plate 16. In this exemplary embodiment, the number of the positioning holes 164 is substantially the same as that of the mounting posts 144, and the positions of each positioning hole 164 are aligned with that of the mounting posts 144. Thus, the mounting posts 144 are detachably received within the positioning holes 164, respectively.

The pressing device 30 includes a cover portion 32 and a pressing portion 34. The cover portion 32 is a substantially rectangular plate, and the pressing portion 34 is located on one surface of the cover portion 32, facing towards the positioning device 10. The pressing portion 34 presses and fixes the screen plate 200 onto the frame 300 adjacent perimeter walls 321.

Figure 2:
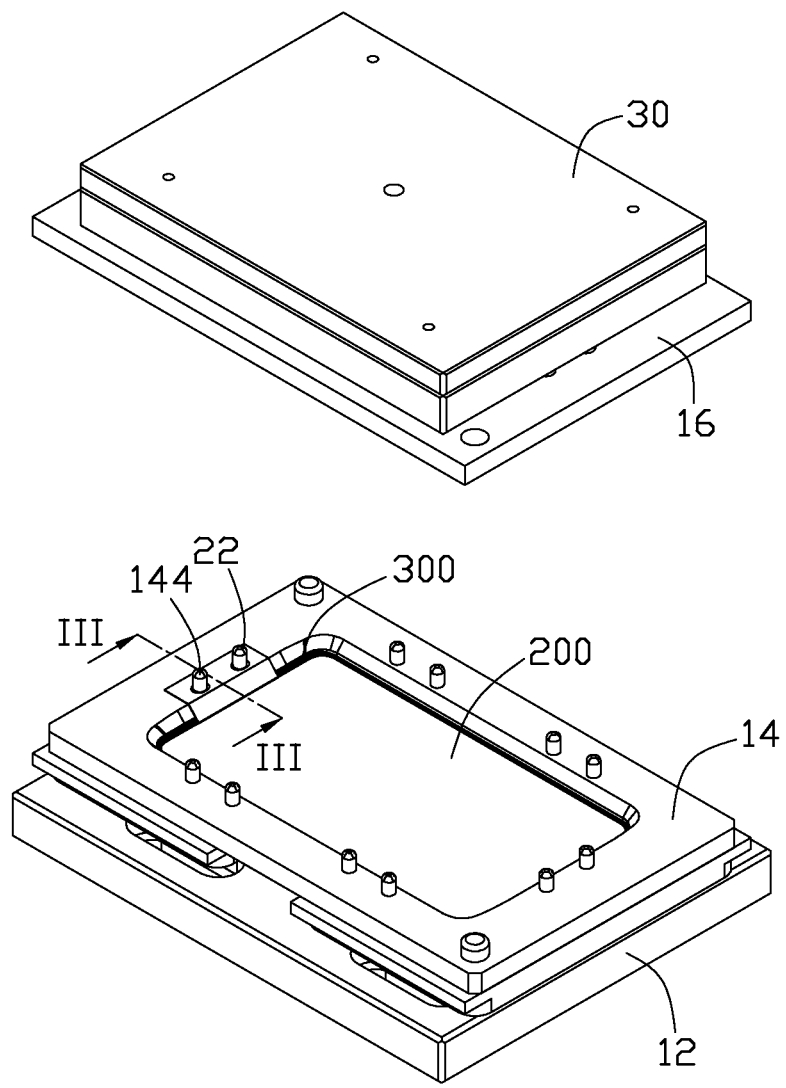
FIG. 2 is a schematic and partial assembled view of the screen installation device shown in FIG. 1 of the disclosure.
Figure 3:
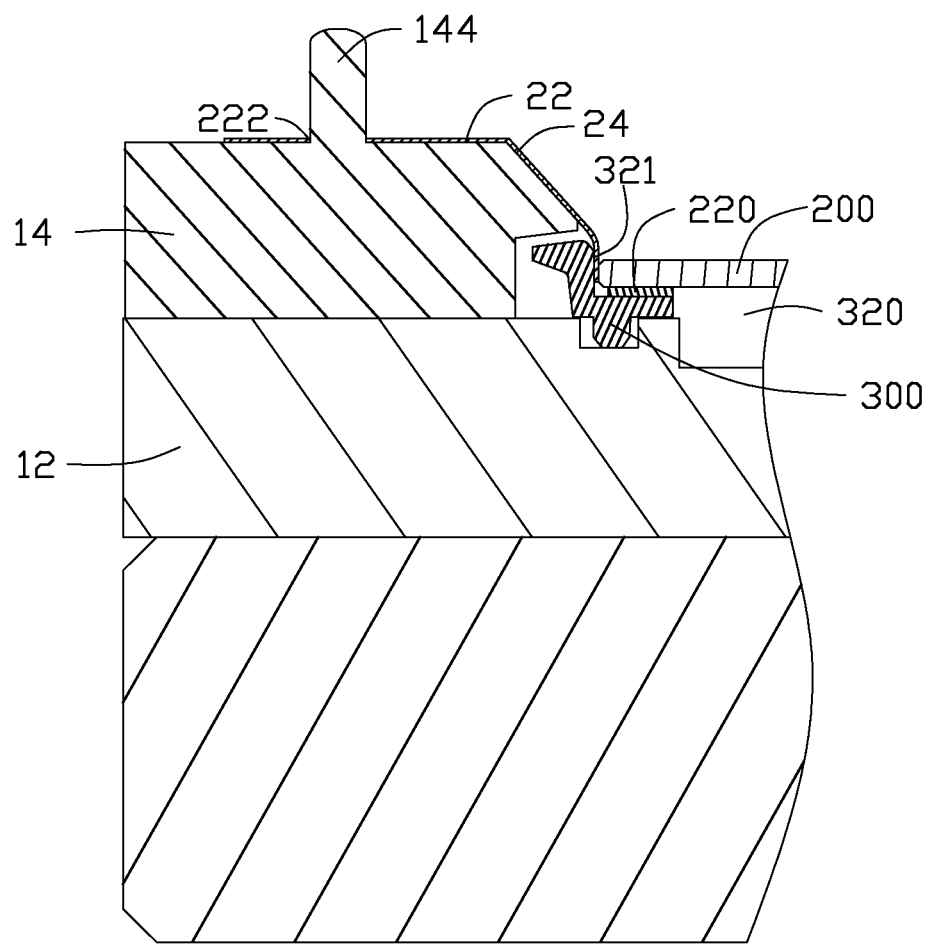
FIG. 3 is an assembled cross-sectional view taken along line III-III of FIG. 2 of the disclosure.

Referring to FIGS. 2 and 3, in assembly, the frame 300 is located on the positioning plate 12, and the first fixed plate 14 is located on the positioning plate 12 to position the frame 300. The frame 300 is located and fixed between the first fixed plate 14 and the positioning plate 12, and the opening 320 of the frame 300 is aligned with the first mounting hole 142 of the first fixed plate 14.

The mounting posts 144 of the first fixed plate 14 are detachably received within the through holes 222 of the mounting portions 22 of the connection devices 20, so the gap creating portions 24 of the connection devices 20 are inserted and received within the first mounting hole 142. The second mounting hole 162 of the second fixed plate 16 is aligned with the first mounting hole 142 of the first fixed plate 14, and the mounting posts 144 are aligned with and are received within the positioning hole 164 to press and fix the mounting portions 22 on the first fixed plate 14.

The screen plate 200 is located within the second mounting hole 162, the pressing portion 34 of the pressing device 30 drives and enables the screen plate 200 to move towards the opening 320 of the frame 300, until the screen plate 200 is adhered on the frame 300 through double-sided adhesive 220 or any other adhesive material. In the assembly process of the screen plate 200, the screen plate 200 pushes the gap creating portions 24 towards the perimeter walls 321 of the frame 300 until the gap creating portions 24 are retained between the screen plate 200 and the perimeter walls 321 of the frame 300. The pressing device 30 and the second fixed plate 16 are then moved away from the first fixed plate 14, and the connection devices 20 are removed, after creating a constant width gap between the screen plate 200 and the perimeter walls 321 of the frame 300.

The number of connection devices 20 is not limited to six, as long as their number and structure maintain a gap between the screen plate 200 and the perimeter walls 321 of the frame 300 of constant width.

In summary, in the exemplary embodiment of the screen installation device 100 of the disclosure, in the assembly process, since the connection devices 20 are evenly retained and located between the screen plate 200 and the perimeter walls 321 of the frame 300, and the connection devices 20 have the substantially same thickness. Thus, when the connection devices 20 are removed, the gap between the screen plate 200 and the perimeter walls 321 of the frame 300 are even and constant width, which meet the production requirements.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A screen installation device used for assembling a screen plate to a frame, the frame including four perimeter walls connected end to end to cooperatively define an opening therebetween, the screen installation device comprising:
   a positioning device for locating the frame; and
   a plurality of connection devices detachably assembled to the positioning device, wherein the connection devices are arranged around the screen plate, each of the connection devices comprises a gap creating portion having substantially the same thickness as the gap creating portion of each other connection device, the gap creating portion of each connection device is located and retained between the screen plate and one of the four perimeter walls of the frame, and the gap creating portions of the connection devices create a constant width gap between the screen plate and the four perimeter walls of the frame.

2. The screen installation device as claimed in claim 1, wherein the positioning device comprises a positioning plate and a first fixed plate, the first fixed plate is located at one side of the positioning plate and defines a first mounting hole, and the first mounting hole is substantially located near the middle of the first fixed plate and extends through the first fixed plate.

3. The screen installation device as claimed in claim 2, wherein the frame is located between the positioning plate and the first fixed plate, the opening of the frame is aligned with the first mounting hole, and the screen plate is detachably assembled and received within the opening.

4. The screen installation device as claimed in claim 3, wherein the positioning device further comprises a second fixed plate, and the connection devices are located and retained between the first fixed plate and the second fixed plate.

5. The screen installation device as claimed in claim 4, wherein the second fixed plate defines a second mounting hole located near the middle of the second fixed plate, and the second mounting hole passes through the second fixed plate and is substantially aligned with the first mounting hole.

6. The screen installation device as claimed in claim 5, wherein each connection device further comprises a mounting portion, the gap creating portion of each connection device extends from the mounting portion, the gap creating portion of each connection device is inserted and received within the first mounting hole, the mounting portion defines at least one through hole, the first fixed plate comprises a plurality of mounting posts located around the first mounting hole and arranged on the surface of the first fixed plate facing towards the second fixed plate, and each of the mounting posts is aligned with and detachably received within the corresponding through hole.

7. The screen installation device as claimed in claim 6, further comprising a connecting assembly cooperatively formed by the mounting portions of the connection devices and the mounting posts, the connecting assembly assures the connection device retains its proper positioning, and the at least one through hole of the mounting portion of each connection device is two through holes.

8. The screen installation device as claimed in claim 6, wherein the second fixed plate further defines a plurality of positioning holes through the second fixed plate, the number of the positioning holes is substantially the same as that of the mounting posts, each of the positioning holes is aligned with one of the mounting posts, and the mounting posts are detachably received within the positioning holes respectively.

9. The screen installation device as claimed in claim 6, wherein the screen plate and the frame are separated by the gap creating portions of the connection devices, and when the connection devices are removed away from the mounting posts, a constant width gap between the screen plate and each perimeter wall of the frame is created.

10. The screen installation device as claimed in claim 6, wherein the plurality of mounting posts of the first fixed plate comprises twelve mounting posts, the mounting posts are round, rectangular, or have an irregular perimeter, and the mounting posts are divided into six groups distributed around the mounting hole, with each group including two mounting posts.

11. The screen installation device as claimed in claim 1, further comprising a pressing device, wherein the pressing device comprises a cover portion and a pressing portion, the pressing portion is located on one surface of the cover portion and faces towards the positioning device, and the pressing portion is configured for pressing and fixing the screen plate onto the frame.

12. A screen installation device used for assembling a screen plate to a frame, the frame including four perimeter walls connected end to end to cooperatively define an opening therebetween, the screen installation device comprising:
   a positioning device for locating the frame;
   a plurality of connection devices detachably located in the positioning device, each of the connection devices comprising a gap creating portion having substantially the same thickness as the gap creating portion of each other connection device; and
   a pressing device for moving the screen plate, wherein the connection devices are arranged around the screen plate, the pressing device enables the screen plate to move towards the frame, the gap creating portion of each connection device is located and retained between the screen plate and one of the four perimeter walls of the frame to separate the screen plate and the frame, and the gap creating portions of the connection devices create a constant width gap between the screen plate and the four perimeter walls of the frame when the connection devices are removed away from the positioning device.

13. The screen installation device as claimed in claim 12, wherein the positioning device comprises a positioning plate and a first fixed plate, the first fixed plate is located at one side of the positioning plate and defines a first mounting hole, and the first mounting hole is substantially located near the middle of the first fixed plate and extends through the first fixed plate.

14. The screen installation device as claimed in claim 13, wherein the frame is located between the positioning plate and the first fixed plate, the opening of the frame is aligned with the first mounting hole, and the screen plate is detachably assembled and received within the opening.

15. The screen installation device as claimed in claim 14, wherein the positioning device further comprises a second fixed plate, the connection devices are retained between the first fixed plate and the second fixed plate, the second fixed plate defines a second mounting hole located near the middle of the second fixed plate, and the second mounting hole passes through the second fixed plate and is substantially aligned with the first mounting hole.

16. The screen installation device as claimed in claim 15, wherein each connection device further comprises a mounting portion, the gap creating portion of each connection device extends from the mounting portion, the gap creating portion of each connection device is inserted and received within the first mounting hole, the mounting portion defines at least one through hole, the first fixed plate comprises a plurality of mounting posts located around the first mounting hole and arranged on the surface of the first fixed plate facing towards the second fixed plate, and each of the mounting posts is aligned with and detachably received within the corresponding through hole.

17. The screen installation device as claimed in claim 16, further comprising a connecting assembly cooperatively formed by the mounting portions of the connection devices and the mounting posts, the connecting assembly assures the connection device retains its proper positioning, and the at least one through hole of the mounting portion of each connection device is two through holes.

18. The screen installation device as claimed in claim 16, wherein the second fixed plate further defines a plurality of positioning holes through the second fixed plate, the number of the positioning holes is substantially the same as that of the mounting posts, each of the positioning holes is aligned with one of the mounting posts, and the mounting posts are detachably received within the positioning holes respectively.

19. The screen installation device as claimed in claim 16, wherein the plurality of mounting posts of the first fixed plate comprises twelve mounting posts, the mounting posts are round, rectangular, or have an irregular perimeter, and the mounting posts are divided into six groups distributed around the mounting hole, with each group including two mounting posts.

20. The screen installation device as claimed in claim 12, wherein the pressing device comprises a cover portion and a pressing portion, the pressing portion is located on one surface of the cover portion and faces towards the positioning device, and the pressing portion is configured for pressing and fixing the screen plate onto the perimeter walls of the frame.

\* \* \* \* \*